INVENTORS
JOE G. HANDLEY &
WALTER J. SALOGA
BY
*Dunlap, James & Hubbard*
ATTORNEYS

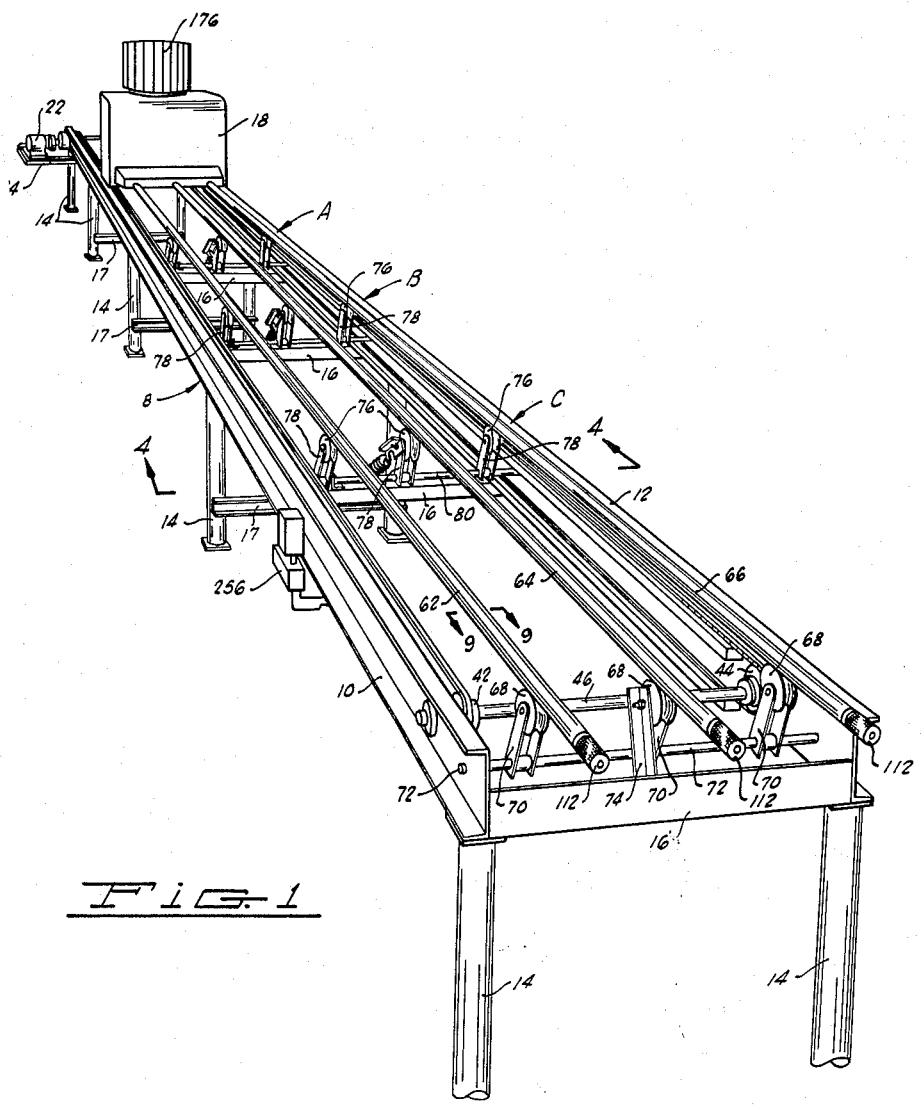

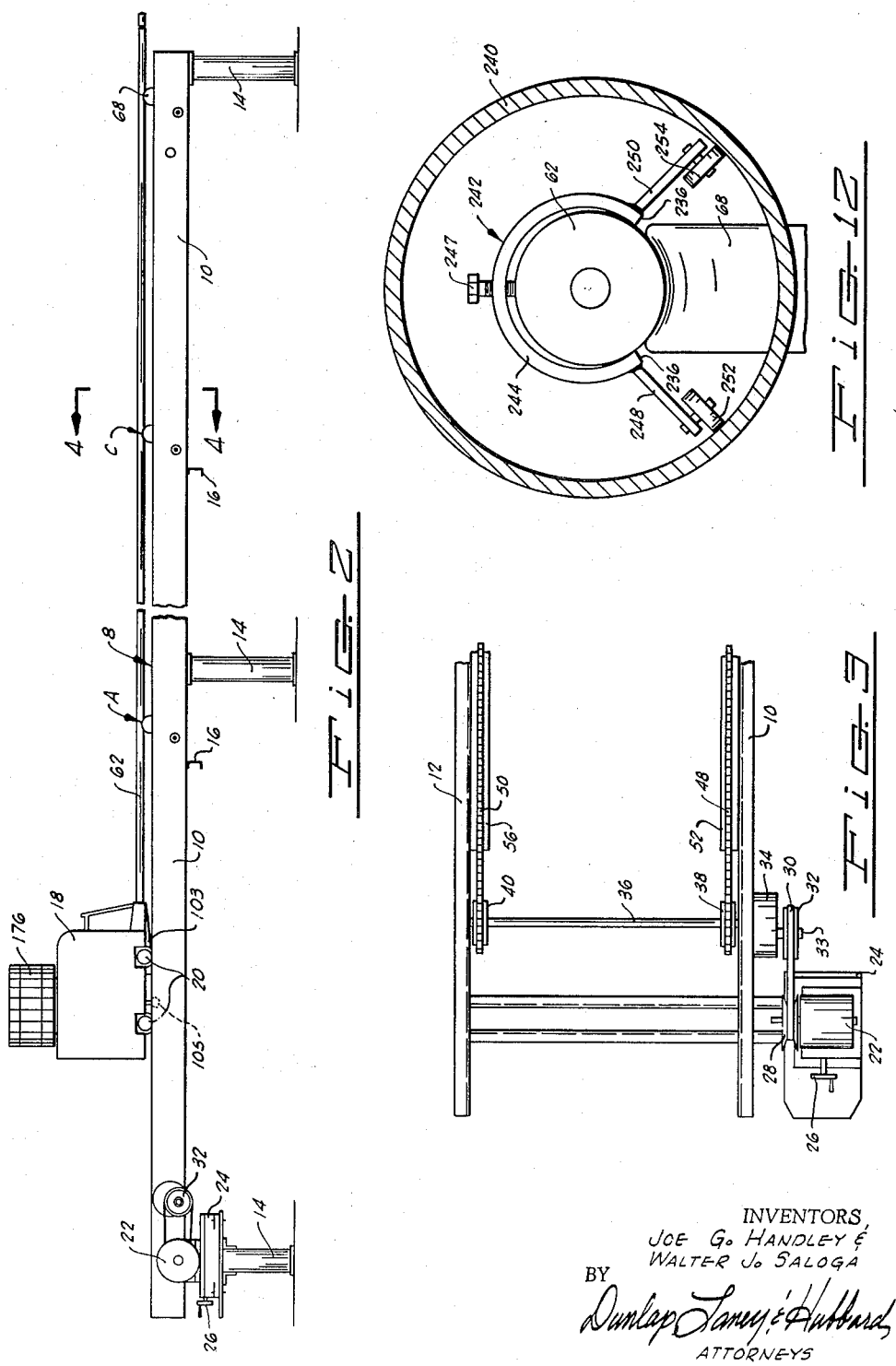

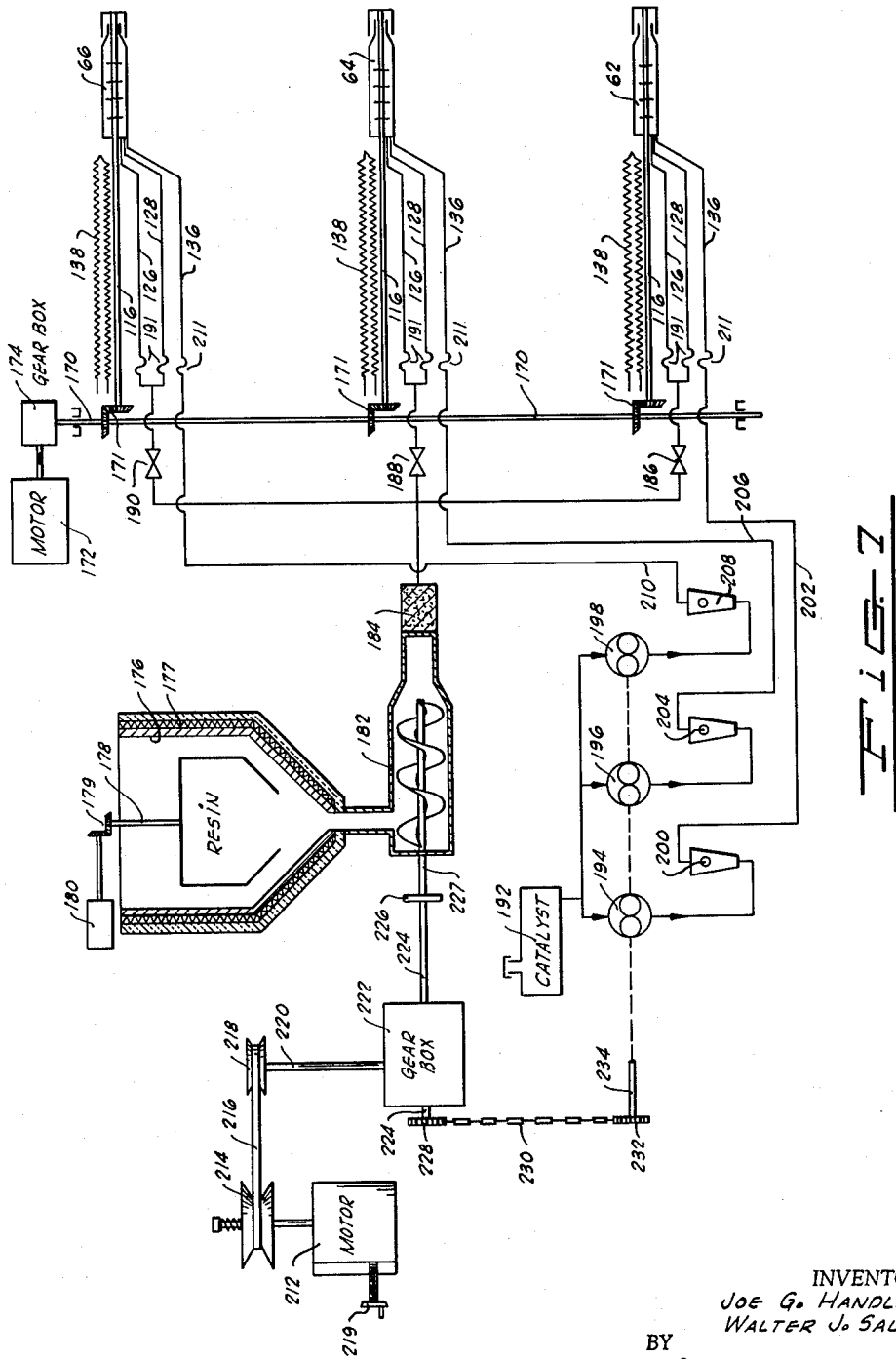

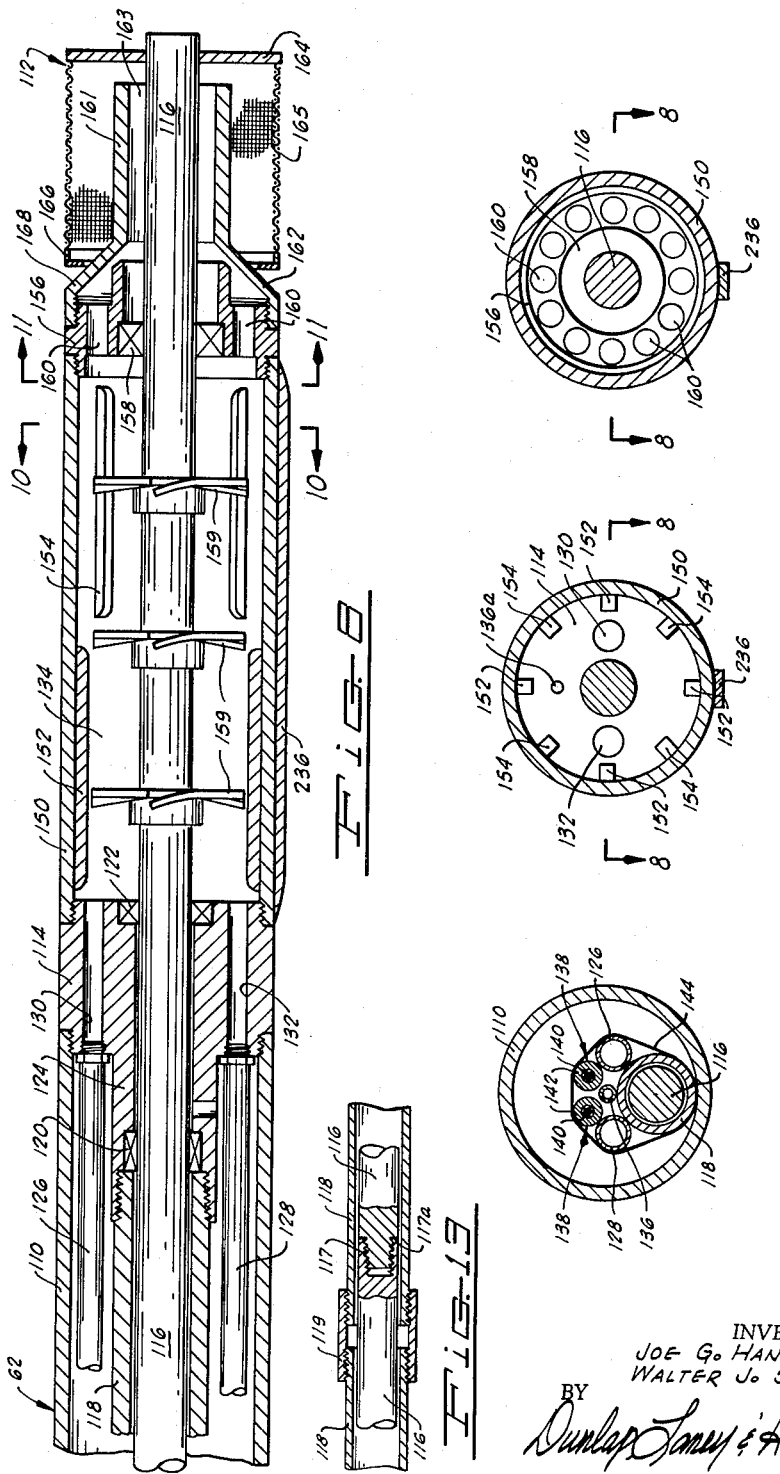

United States Patent Office 3,180,312
Patented Apr. 27, 1965

3,180,312
APPARATUS FOR INTERNALLY COATING
SMALL DIAMETER PIPE
Joe G. Handley, Edmond, and Walter J. Saloga, Oklahoma City, Okla., assignors to Associated Protective Coatings, Inc., Oklahoma City, Okla., a corporation of Oklahoma
Filed Sept. 20, 1961, Ser. No. 139,384
11 Claims. (Cl. 118—302)

The present invention relates to apparatus for applying a protective coating to the inside of pipe, and more particularly, but not by way of limitation, relates to a machine for applying an internal protective coating of coal tar epoxy resin to a relatively long joint of relatively small diameter pipe.

As is well known in the coating art, coal tar epoxy resins and other similar protective coating materials have been successfully used for several years to protect metallic receptacles and conduits from the corrosive effects of various chemicals and, in particular, from the highly corrosive effects of crude petroleum in the presence of water. Coal tar epoxy resin in raw form is a black, sticky, generally insoluble liquid which, when once applied to a surface in raw form, serves no useful purpose and is exceedingly difficult to remove. The raw resin is highly viscous at lower temperatures, but flows more freely at higher temperatures. However, when the raw resin is thoroughly mixed with the proper catalyst or accelerator, the molecular structure of the resin realigns to form a highly stable, very tenacious, extremely hard, glossy black plastic material. The cured resin is ideally suited to protect the interior of fluid conduits because the material bonds securely to the metal and forms a smooth coating which offers little frictional resistance to fluid flow.

In addition to difficulties created by its high viscosity, one of the most difficult problems of applying coal tar epoxy resin to the interior of pipe is caused by the fact that, once the raw resin is mixed with the catalyst, the resin fairly rapidly and irrevocably sets up to form the hard coating material. Therefore, when the resin is mixed in the more conventional coating machines having a mixer located outside the pipe with long conduits extending to an applicator head inserted in the pipe, there is a very real danger that the resin will set up and ruin the machine, unless the entire mechanism is quickly and thoroughly cleaned soon after use. Thorough cleaning is not always possible or practical. Because of these inherent physical properties, coal tar epoxy resins have been applied only to large, easily acessible surfaces, such as storage tanks and large diameter pipe. This limited use of the epoxy resins for protective coatings is due only to the fact that no machines have been developed capable of coating small diameter pipe, because an acute demand exists for a protective coating to prevent corrosion in the small two-inch flow lines used extensively in the vast water-flood projects of the crude oil producing industry.

Various machines are known in the art for internally coating large diameter pipe. Usually the entire machine, comprising coating and catalyst supply receptacles, mixing chambers and prime movers, is transported through the large diameter pipe. These machines normally use either centrifugal force or mechanical spreading means to apply the coating material to the interior wall of the pipe. A few machines have been developed which use an applicator head on the end of a lance. The applicator head and lance may be moved through the pipe, or the pipe may be telescoped over the applicator head and lance. However, all of the prior art devices have large diameters and because of structural design, cannot be made small enough to be introduced to small diameter pipe.

It is contemplated by the present invention to provide a machine for internally coating pipe as small as two inches in diameter and up to 60 feet in length. The machine in accordance with this invention features a track comprised of a pair of parallel rails having front and rear ends. A carriage is propelled in either direction along the track by a selectively variable speed, reversible drive motor. At least one, and preferably three, elongated lances each have applicator heads at one end and are connected to the carriage at the other end. The lances are disposed above and between the rails and extend parallel thereto. A plurality of support rollers are provided between the rails for supporting each of the lances at spaced points. The support rollers extend above the rails to support the lances, but are depressed by passage of the carriage into a retracted position. The support rollers remain in the retracted position until the carriage passes back over the rollers at which time the rollers are raised to support the lances. The present invention also features an improved lance construction. The improved lance is provided with a resin and catalyst mixing chamber and a centrifugal applicator head at the end remote from the carriage. A drive shaft for rotating the applicator head and mixing blades in the mixing chamber extends through each lance and is driven by a prime mover mounted on the carriage. Separate conduits extend through the lance for conveying resin and catalyst from separate receptacles on the carriage to the mixing chamber. A novel drive shaft bearing housing both isolates and supports the drive shaft for the length of the lance. Despite its small diameter, the lance also contains heater means for controlling the viscosity of the resin as it passes through the lance.

The present invention also features a novel means for controlling the thickness of coating applied to the interior wall of a pipe and for adapting the machine to coat larger diameter pipe. The rotational speed of the centrifugal applicator head is standardized at optimum r.p.m. The proportionate parts of epoxy resin and catalyst delivered to the mixing chamber and hence to the applicator head is maintained constant by separate positive displacement pumps which are driven at proportionate speeds by a single prime mover. The thickness of the protective coating applied to the interior of the pipe is controlled by selecting the speed at which the carriage is moved along the track to withdraw the lance from the pipe. As the speed is reduced, the thickness of the coat increases. Or, when coating larger diameter pipe, the speed of the carriage and lances is reduced to apply a greater quantity of coating material which is necessary to cover the greater area of the larger diameter pipe. A novel means is also provided for supporting the small diameter lance along the axis of the larger diameter pipe.

Therefore, it is an important object of the present invention to provide a machine for applying an internal protective coating to relatively small diameter pipe of relatively great length.

Another object of the present invention is to provide an improved lance construction of small diameter which can be inserted into relatively small diameter pipe to apply an internal coat of protective material thereto.

Another object of the present invention is to provide an improved centrifugal applicator head and mixing chamber design for a small diameter lance of the type described.

Another important object of the present invention is to provide an improved bearing support for an elongated drive shaft in a lance of the type described.

Another important object of the present invention is to provide an improved mechanism for inserting a lance of the type described into and then withdrawing the lance at a uniform speed from a joint of pipe.

Another important object of the present invention is to provide an improved means for controlling the volume and proportionate parts of the epoxy resin and the curing catalyst delivered to the mixing head of the lance described.

Another important object of the present invention is to provide an improved means for controlling the viscosity of the coating material introduced to the applicator head of the lance described.

Another important object of the present invention is to provide a means whereby the coating machine described can readily be adapted to coat larger diameter pipe.

Many additional objects and advantages will be evident from the following detailed description and drawings, wherein:

FIG. 1 is a perspective view from the forward end of a coating machine constructed in accordance with the present invention.

FIG. 2 is a simplified side elevation, broken in the center, of the coating machine of FIG. 1.

FIG. 3 is a plan view of the rear end of the coating machine of FIG. 1.

FIG. 7 is a flow diagram of the pipe coating machine of FIG. 1.

FIG. 8 is a sectional view taken on the longitudinal axis of the free end portion of a lance of the coating machine of FIG. 1.

FIG. 9 is a cross-sectional view taken substantially on line 9—9 of FIG. 1.

FIG. 10 is a cross-sectional view taken substantially on line 10—10 of FIG. 8 with some of the working parts removed to better illustrate the invention.

FIG. 11 is a cross-sectional view taken substantially on line 11—11 of FIG. 8.

FIG. 12 is a cross-sectional view through a joint of large diameter pipe showing a novel support device for use in combination with the coating machine of FIG. 1 for internally coating relatively large diameter pipe.

FIG. 13 is a longitudinal sectional view through the drive shaft and drive shaft bearing housing of the lance of the machine of FIG. 1.

Figure 4:
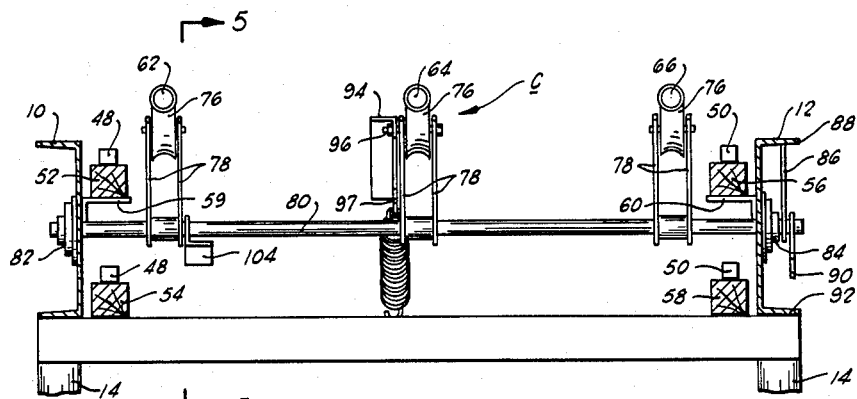
FIG. 4 is a cross-sectional view taken substantially on lines 4—4 of FIG. 1.

Referring now to the drawings, and in particular to FIGS. 1 and 2, a track, indicated generally by the reference numeral 8, is formed by a pair of channel rails 10 and 12 which are supported in horizontal, spaced, parallel relationship by a plurality of legs 14 and interconnecting transverse brace members 16 and 17. A carriage member 18 has wheels 20 which travel on the rails 10 and 12 of the track 8.

The carriage 18 is propelled in either direction along the track 8 by a reversible, constant speed electric motor 22. The motor 22 is supported on a motor mount 24 and is adjustable in a direction parallel to the rails 10 and 12 by a handwheel 26. A spring-loaded, split-sheeve, variable-diameter pulley 28 is mounted on the drive shaft of the motor 22 and is connected by a belt 30 to drive a sheeve 32. When the position of the motor 22 is adjusted by the handwheel 26, the effective diameter of the spring-loaded pulley 28 is automatically varied by tension in the belt 30 to change the drive ratio between the motor 22 and the sheeve 32. The sheeve 32 is splined on the input shaft 33 of a gearbox 34 which is mounted on the rail 10. The output shaft 36 of the gearbox 34 is journaled in bearings (not shown) attached to the rails 10 and 12.

Equally sized chain sprockets 38 and 40 are splined on the shaft 36. Similar chain sprockets 42 and 44 (see FIG. 1) are journaled on a shaft 46 which is connected at opposite ends to the rails 10 and 12. A chain 48 passes around the sprockets 38 and 42. The ends of the chain 48 are connected to the carriage to form, in effect, an endless chain. Similarly, a chain 50 passes around the sprockets 40 and 44 and is connected at both ends to the carriage 18. Therefore, when the drive motor 22 is operated in one direction, the shaft 36 and the sprockets 38 and 40 will be simultaneously rotated to drive the chains 48 and 50 and to propel the carriage 18 in one direction along the track 8. Reversal of the motor 22 will propel the carriage 18 in the other direction along the track.

The upper and lower reaches of the chain 48 intermediate the sprockets 38 and 42 may be supported by wooden runners 52 and 54, respectively, to reduce friction. Similarly, the upper and lower reaches of the chain 50 may be supported by wooden runners 56 and 58. The runners 52 and 56 may be supported on brackets 59 and 60, respectively, while the runners 54 and 58 may be supported on the transverse cross braces 16.

Three identical lances 62, 64 and 66 are connected to the carriage 18. The lances are disposed above and parallel to the rails 10 and 12, and extend forwardly from the carriage 18. The three lances are supported by a set of front idler support rollers 68, one for each lance, located at the front end of the rails 10 and 11. The front rollers 68 may be journaled on arms 70 which are fixed to a rod 72. The rod 72 extends transversely between the rails 10 and 12, and passes through apertures in the webs of the respective rails. An angle iron brace 74 may interconnect the transverse brace 16 and center arm 70 to rigidly support the three rollers 68 at the proper height above the rails 10 and 12 and thereby maintain the three lances 62, 64 and 66 at the proper height for simultaneous introduction to three joints of pipe as hereafter described.

Figure 5:
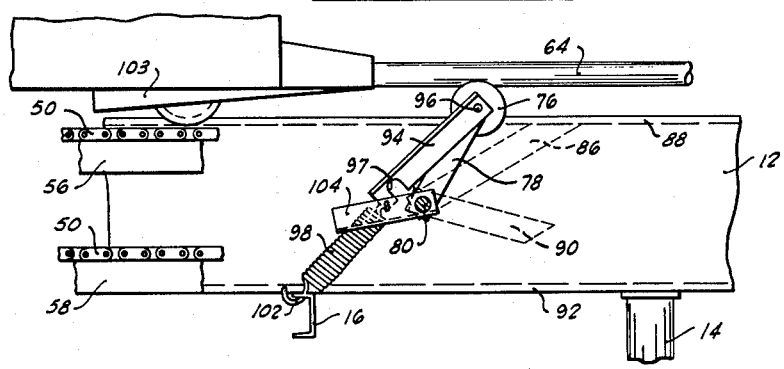
FIG. 5 is a cross-sectional view taken on lines 5—5 of FIG. 4, showing a group of support rollers in raised position for supporting a lance, and showing the carriage passing over the support rollers.
Figure 6:
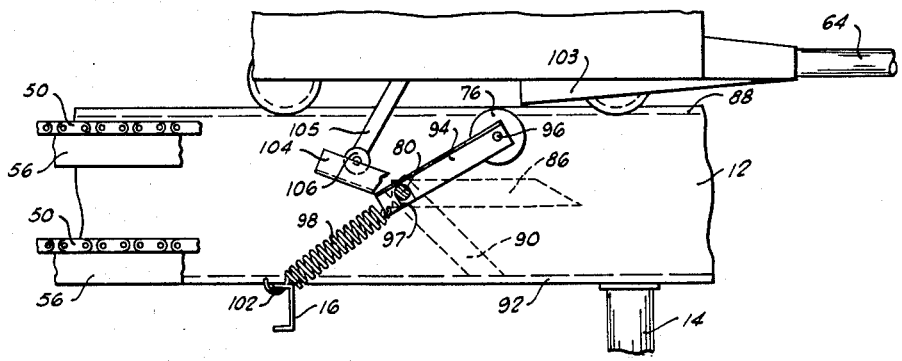
FIG. 6 is the cross-sectional view of FIG. 5, but showing the roller group rotated to a depressed position to illustrate the operation of the machine of FIG. 1.

The three lances 62, 64 and 66 are supported at intermediate points between the ends of the rails 10 and 12 by three identical sets A, B and C of interconnected lance support rollers 76. Roller set C is shown in FIGS. 4–6 and will be illustrative of the other two roller sets A and B. Each of the three support rollers 76 of each of the three sets is journaled on a bifurcated arm 78. Each of the arms 78 is rigidly connected to a pivot axle 80 which extends between the two rails 10 and 12, where the axle 80 is pivotally journaled in bearings 82 and 84, respectively. Therefore, all three rollers 76 of each roller set are interconnected by and pivoted with the respective pivot axle 80 so that all three rollers 76 of a set can be simultaneously lowered below the level of the upper surface of the rails 10 and 12 to the position shown in FIG. 6.

A stop lever 86 is rigidly connected to the end of the shaft 80 and is arranged to engage the upper flange 88 of the rail 12 as best seen in FIG. 4. The stop lever 86 is placed at an angle and is of such a length as to engage the upper flange 88 when the three rollers 76 are pivotally raised by the arms 78 to a level such as to support the respective lances at the proper height. A second stop lever 90 is also rigidly connected to the shaft 80 and is positioned to contact the lower flange 92 of the rail 12 when the arm 78 and roller 76 are pivotally depressed to the positions shown in FIG. 6, so as to permit the carriage 18 to pass along the rails 10 and 12 over the rollers 76, as hereafter described.

An angle iron link 94 is pivotally connected to the middle arm 78 by the axle bolt 96 which journals the center roller 76 of the roller set C, for example. The link 94 has a U-shaped groove 97 positioned to pass around the shaft 80 when the arms 78 are pivoted into the pivotally lowered or retracted position shown in FIG. 6. A coil spring 98 interconnects the free end of the angle iron link 94 and a transverse cross brace 16 which extends between the two rails 10 and 12 at point 100. The spring must be sufficiently strong to support the lances on the support rollers 68. When the rollers 76 are depressed and the arms 78 pivot downwardly sufficiently that the line of force between the axle bolt 96 and the point 102 where the spring 98 is connected to the transverse member 16 passes below the center of the pivot shaft 80, which occurs as the U-shaped groove 97 passes around the shaft 80, the tension force of the spring 98 will then act to pivot the arms 78 and rollers 76 downwardly until the stop lever 90 engages the lower flange 92 of the rail 12.

A lever cam 104 is comprised of an angle iron arm rigidly connected to the shaft 80. The lever cam 104 extends slightly downwardly from the shaft 80 when the arms 78 and rollers 76 are in the raised position shown in FIG. 5. However, as shown in FIG. 6, the cam lever 104 is raised above the pivot shaft 80 when the rollers 76 are depressed below the top of the rails 10 and 12.

An inclined plane or wedge cam 103 is connected to the bottom of the carriage 18 and is located to engage the right hand roller 76 of each of the roller sets A, B and C. The wedge cam 103 forces the right hand roller 76, and consequently the other two interconnected rollers 76 of the same roller set, downwardly as the carriage 18 travels forwardly over the track 8. The wedge cam 103 depresses the rollers 76 until the line of force of the spring 98 and link 94 passes below the pivot shaft 80 so that the roller set is snap-locked by the spring 98 into the retracted position shown in FIG. 6. The roller set then will remain in the retracted position as the carriage 18 continues to move forward along the track 8.

As the carriage 18 is then moved rearwardly along the track 8 and passes over a retracted set of rollers 76, as shown in FIG. 6, a roller cam 105 projecting from the bottom of the carriage 18 will engage the cam lever 104 and pivot it downwardly, thereby raising the interconnected arms 78 and rollers 76 until the effective line of force of the spring 98 passes above the pivot axle 80. The spring 98 will then exert a force to pivotally raise the arms 78 and rollers 76 back to the lance supporting position shown in FIG. 5. In this respect, the roller cam 105 may be located at any transverse position on the carriage 18 and the lever cam 104 at any corresponding position on the pivot shaft 80, as desired. The roller cam 105 engages the inclined flange 106 of the lever cam 104 to raise the roller 76.

The relative positions of the roller cam 105 and the wedge cam 103 is critical. The roller cam 105 must pass forwardly of the end of the lever cam 104 before the roller 76 and arm 78 are snap-locked downwardly into the retracted position by the spring 98. Otherwise, the end of the lever cam 104 would be raised so high that the roller cam 105 on the carriage 18 would strike the cam 104 upon continued forward travel of the carriage 18. Similarly, the rear end of the wedge cam of the carriage 18 must pass the respective roller 76 before the roller cam 105 engages the lever cam 104 to raise the roller 76. Otherwise, the roller 76 would be raised too high for the lowermost part of the wedge cam 103 to pass as the carriage 18 travels rearwardly. However, if the two cam means are properly arranged, on the forward travel, the roller cam 105 will pass the lever cam 104 just prior to the time that the spring 98 snaps the roller 76 and arm 78 into the retracted position. Then, when the carriage 18 is returning or traveling in the rearward direction, the lowermost or rear end of the wedge cam 103 will just pass the roller 76 when the roller cam 105 has engaged the lever cam 104 and raised the roller 76 to the point where the spring 98 exerts a force to pivot the arm 78 back into the raised position. At this time, the wedge cam will be sufficiently close to the roller 76 which it engages that only the slightest noise is heard as the spring 98 snaps the roller 76 back against the inclined surface of the wedge cam 103. Then the wedge cam 103 slowly permits the respective rollers 76 to rise back into contact with the respective lance 62, 64 and 66 as the carriage 18 continues to move rearwardly.

The lances 62, 64 and 66 are preferably identical in construction. Therefore, for convenience of discussion, only the lance 62 will be described in detail. Referring now to FIGS 8–11, the lance 62 is comprised of a tubular lance housing 110 which is connected at the rear end to the carriage 18 and has a centrifugal applicator head 112 at the other end. An adaptor 114 is threaded into the front end of the lance housing 110. A drive shaft 116 is disposed in the lance housing and extends from the carriage 18 where it is geared to be driven by a prime mover, as schematically shown in FIG. 7 and hereafter described. The drive shaft 116 is completely housed within a tubular drive shaft housing 118 which not only shields the shaft but provides bearing support to the shaft for the length of the lance housing 110. The shaft bearing housing 118 is continuous and fluid tight and preferably is supplied with lubricating oil for reducing the friction between the shaft 116 and housing 118. The drive shaft 116 is also journaled in bearings 120 and 122 in the adaptor 114. The drive shaft bearing housing 118 is threaded into a shank portion 124 of the adaptor 114. Since the drive shaft 116 is of relatively large diameter, it would be impractical to use a single piece drive shaft 60 feet or more in length. Therefore, the drive shaft 116 is preferably fabricated from a plurality of equal diameter rods joined by threaded couplings 117 (see FIG. 13) which comprise a threaded tap and stud with abutting shoulders 117a for transmitting torque. Similarly, the drive shaft bearing housing 118 may be comprised of several lengths or joints of pipe of the proper internal diameter joined together by the conventional threaded collar coupling 119.

A pair of coating resin conduits 126 and 128 also extend through the lance housing 110. The coating resin conduits 126 and 128 are connected to supply epoxy resin to the bores 130 and 132, respectively, which extend through the adaptor 114 and communicate with a mixing chamber 134 as hereafter described in detail. Similarly, a much smaller catalyst conduit 136 (see FIG. 9) extends through the lance housing 110 and is threaded into a bore 136a (see FIG. 10 only) in the adaptor 114, to supply catalyst to the mixing chamber 134 as hereafter described.

A resistance type, electrical strip heating element 138 is also disposed in the lance housing 110 in heat exchange relation with the several conduits 126, 128 and 136. The heating element preferably comprises a single electrical conductor 140 enclosed within, but insulated from, a lead sheath 142. The heating element 138 extends from a power source on the carriage 18 through the length of the lance housing 110, and back through the lance housing 110 to the source at the carriage to complete the circuit. The current to the strip heater 138 is preferably controlled by a suitable thermostatic switch to maintain the desired temperature.

Although the drive shaft 116 and drive shaft housing 118 are relatively large and stiff, they are sufficiently flexible that the housing 118 will normally rest on the bottom of the tubular lance housing 110 at points intermediate the ends of the lance. The resin conduits 126 and 128 and catalyst conduit 136, together with the resistance heating element 138, are preferably arranged substantially as shown in FIG. 9 and bound to the drive shaft housing 118 at spaced intervals by wraps of tape 144. This not only insures good heat exchange between the strip heating element 138 and the fluids in the conduits, but also prevents destruction of the conduits and heater by the drive shaft and shaft housing, which, during operation, is subject to considerable vibration and, if left free, might arrange itself over the more fragile conduits or heater element. Although the lance housing 110 provides an excellent heat retaining enclosure for insuring good heat exchange between the electrical heating element 138 and the fluid passing through the conduits 126, 128 and 136, if desired the tape 144 could be selected for its heat insulating properties and could be wrapped around the several conduits, heating elements and shaft housing for the length of the housing 110.

A mixing chamber sleeve 150 is threaded onto the adaptor 114 as shown in FIG. 8. A bearing housing 156 is threaded into the end of the sleeve 150 and provides a support for a bearing 158 in which the drive shaft 116 is journaled. The adaptor 114 forms the first end wall, the sleeve 150 forms the body, and the bearing housing 156 forms the second end wall of the mixing chamber 134 previously mentioned for mixing resin and catalyst. A set of peripherally spaced longitudinally extending ribs 152 are connected to the sleeve 150 and the upstream end of the mixing chamber 134. A second set of similar ribs 154 are connected at offset positions to the ribs 152 in the sleeve 150 at points downstream of the chamber 134. A plurality of mixing discs 159 are connected to and rotated by the shaft 116 as the drive shaft passes through the mixing chamber 134. The bearing housing 156 is provided with a plurality of exit bores 160 for passing fluid from the mixing chamber 134. A funnel sleeve 162 is threaded onto the bearing housing 156. The funnel sleeve 162 directs fluid passing through the bores 160 through a portion 161 of reduced diameter around the shaft 116, and introduces the fluid through an open end 163 to the centrifugal applicator head indicated generally by the reference numeral 112.

The centrifugal applicator head 112 has a disc-shaped plate 164 which is connected to the shaft 116. A cylindrically shaped, woven wire mesh screen 165 is connected to the plate 164 and extends rearwardly around the funnel sleeve 162. The rear end of the cylindrical screen is provided with a stiffening ring 166 which has an internal opening closely fitting the conical portion 168 of the funnel sleeve 162.

FIG. 7 is a schematic flow diagram of that portion of the machine of FIGS. 1 and 2 which is carried by the carriage 18 and contained within the lances 62, 64 and 66. The three drive shafts 116 of the three lances are driven from a single shaft 170 by suitable bevel gearing 171. The shaft 170 in turn is driven by an electric motor 172 through a gearbox 174.

A relatively large resin receptacle 176 contains a supply of coal tar epoxy resin or other similar coating material. The receptacle 176 is preferably heated by a suitable electrical resistance coil 177 and is continually agitated by a revolving agitator fork 178 driven through bevel gears 179 by an electric motor 180. The coating material in the receptacle 176 passes by gravity to a positive displacement resin pump 182 which is preferably of the auger type as schematically represented in the drawing. The resin pump 182 pumps a constant volume, depending only upon the speed of the pump, of the coating material through a filter 184. The resin then passes through the three separate valves 186, 188 and 190 and through flexible couplings 191 into the dual component lines 126 and 128 of the respective lances 62, 64 and 66. The conduits 126 and 128 then introduce the coating material to the mixing chamber 134 as previously described.

A catalyst receptacle 192 contains a supply of a catalyst which cures the coal tar epoxy resin coating material when thoroughly mixed therewith to produce a hard coating. The catalyst is fed by gravity from the receptacle 192 to three positive displacement catalyst pumps 194, 196 and 198. Since the catalyst is a very low viscosity fluid, gear-type positive displacement pumps are ideally suited for pumping controlled volumes of the catalyst, depending upon the speed of the pumps. The catalyst is forced from the pump 194, through a visual flow indicator 200 and through conduit 202 to the conduit 136 which, as previously described, is connected to the bore 136a and therefore to the mixing chamber 134 of the lance 62. Similarly, the catalyst is pumped from pump 196 through a visual flow meter 204 and through conduit 206 to the conduit 136 in the center lance 64; and from gear pump 198 through visual flow meter 208 and conduit 210 to the conduit 136 of the lance 66. Flexible couplings 211 connect the conduits 202, 206 and 210 to the respective conduits 136.

The electrical resistance heating elements 138 which are disposed in each of the lances 62, 64 and 66 may each be separately controlled by a thermostat switch (not shown), if desired, and are connected to a standard source of electrical power.

The resin pump 182 and the three catalyst pumps 194, 196 and 198 are driven by the same electric motor 212. The motor 212 drives a variable diameter pulley 214 which is connected by a belt 216 to a sheave 218. The pulley 214 has a split sheeve which is spring biased together. The position of the motor 212 can be adjusted by the handwheel 219 to automatically vary the effective diameter of the pulley 214 by operation of the spring-biased split sheeve to automatically adjust the speed at which the sheave 218 is driven. The sheave 218 is connected to drive the input shaft 220 of a reduction gearbox 222. The output shaft 224 of the reduction gearbox 222 is connected by a suitable flexible coupling 226 to the drive shaft 227 of the resin pump 182. The other end of the output shaft 224 is fitted with a chain sprocket 228 which is connected by a chain 230 to a sprocket 232. The sprocket 232 drives a shaft 234 which is connected to simultaneously drive each of the three catalyst pumps 194, 196 and 198. Since the auger-type resin pump 182 and the gear-type catalyst pumps 194, 196 and 198 are positive displacement pumps and are driven by the same motor but at different speeds, the resin and the catalyst will always be delivered to the respective mixing chambers in the same proportion.

So much of the machine heretofore described is particularly adapted for coating small diameter pipe and, in particular, for applying an internal coat of coal tar epoxy resin to two-inch pipe used extensively for constructing flow lines between the well-head and the storage tanks in a producing oil field. In the embodiment described, the diameter of each of the three lances is less than 1¾ inches. In order to position the applicator head 112 along the longitudinal axis of the pipe, a spacer rib 236 is provided on the bottom of the mixing chamber sleeve 150 to hold the applicator head 112 up from the lower surface of the pipe. The remainder of the lance slides directly on the wall of the small diameter pipe. It has been found through experience that the spacer 236 can be eliminated and the lance inserted in the pipe so small as to barely receive the applicator head 112 and still operate perfectly.

In order to make the pipe coating machine economically practical, it must be readily adaptable to coat pipe of larger internal diameter. In order to maintain the lance and, in particular, the centrifugal applicator head 112, aligned along the longitudinal axis of larger diameter pipe 240 (see FIG. 12) so as to insure a uniform coat, means must be provided which will support the lance while within the enlarged pipe, but which will not interfere with the support rollers 68 and 76 while the lances are traveling over the support rollers outside the pipe. This problem has been solved by a removable lance support indicated generally by the reference numeral 242. The lance support 242 can easily be clamped at any number of points along each of the lances 62, 64 and 66. Each lance support 242 is comprised of a semicircular rigid band 244 having a diameter slightly greater than the lances so as to be easily slipped over the ends thereof. The semicircular band 244 has a discontinued portion 246 for receiving the rollers 68 and 76, as the case may be. A bolt 247 is threaded through the top of the band 244 and may be screwed down against the lance to securely clamp the support 242 in place on the lance. A pair of arms 248 and 250 are connected to the ends of the band 244 and extend at divergent angles as shown in FIG. 12. Rollers 252 and 254 are journaled on the ends of the arms 248 and 250, respectively, and engage and roll on the interior wall of the larger diameter pipe 240 as the lance is moved into and retracted from the joint of pipe 240 during the coating procedure.

In operation, the interior walls of joints of pipe which are to be coated are sandblasted or otherwise cleaned to a shining surface in preparation for coating and are placed on a rack (not shown) of proper height located adjacent the front of the machine. A separate joint of pipe is longitudinally aligned in front of each of the lances 62, 64 and 66. An operator standing at the control switch 256 (see FIG. 1) then starts the motor 22 in the forward direction to move the carriage 18 forwardly along the rails 10 and 12 and move the three lances 62, 64 and 66 over the sets A, B and C of pivotable support rollers 76, and over the stationary end support rollers 68.

As the carriage 18 is moved forwardly to insert the three lances into the respective joints of pipe, the carriage first approaches the most rearward roller set A. The wedge cam 103 connected to the bottom of the carriage 18 then engages the right-hand roller 76 of the roller set A and slowly depresses the three interconnected rollers 76 until the effective line of force of the spring 98 passes below the pivot shaft 80. At this point of carriage travel, the roller cam 105 has passed the free end of the lever cam 104. The spring 98 then snaps the rollers 76 and associated support arms 78 downwardly until the stop lever 90 engages the lower flange 92 of the rail 12. The spring 98 will hold the rollers 76 in the pivotally retracted position shown in FIG. 6 until the carriage 18 returns as hereafter described. The roller sets B and C are successively forced downwardly into the pivotally retracted position as the carriage 18 travels forwardly to insert the three lances into the aligned joints of pipe.

When the three lances have been moved into the joints of pipe a sufficient distance that the applicator heads 112 extend beyond the other ends of the joints, the motor 122 is started and the drive shaft 116 and the applicator head 112 to which the shafts are attached are accelerated to operating speed, which is approximately 3400 r.p.m. Almost simultaneously, the motor 212 is started to operate the several resin and catalyst pumps. The coating resin, which will normally be a coal tar epoxy resin, has been previously heated by the heating element 177 and continuously agitated to insure the proper fluid viscosity in the resin supply receptacle 176. The motor 212 drives the auger pump 102 as previously described and forces the coating resin through the filter 184 and through the three valves 186, 188 and 190. The coating resin then passes through the conduits 126 and 128 of each of the respective lances and is introduced through the bores 130 and 132 into the mixing chamber 134, as previously described. Simultaneously, the catalyst is fed by gravity from the catalyst supply receptacle 192 to the respective catalyst pumps 194, 196 and 198. Each catalyst pump then pumps a proportionate amount of catalyst through each of the conduits 202, 206 and 210, through the respective conduits 136 and bores 136a to the mixing chambers 134 of the three lances. The coating component and the catalyst are thoroughly mixed by the combined action of the mixing blades 159, which are connected to the drive shaft 116 and are being rotated at approximately 3400 r.p.m., and the longitudinal ribs 152 and 154 on the walls of the sleeve 150.

The thoroughly admixed coating resin and catalyst are then forced through the plurality of exit bores 160 in the bearing housing 156 into the funnel sleeve 162. The funnel sleeve 162 conducts the mixture to the remote end of the applicator head 112 where it is introduced against the plate 164. By introducing the mixture at the center of the rotating plate 164, the mixture is more evenly distributed by centrifugal force to the periphery of the plate and to the wire mesh cylinder 165. The coating material is then forced by centrifugal force through the wire mesh screen cylinder 165 and is evenly deposited on the interior walls of the pipe. The annular stiffening ring 166 serves to prevent any excessive coating material which might reach that point from spilling over the end of the applicator head 112 to unevenly coat the pipe.

Once the coating mixture is being expelled from the three applicator heads 112 at a uniform, stabilized rate, the motor 22, which propels the carriage 118, is started in reverse direction by the operator standing at the control switch 256. The carriage 118 is then moved rearwardly along the rails 10 and 12 by operation of the endless chains 48 and 50 as previously described. As the respective lances are withdrawn at a uniform rate through the joint of pipe, the applicator heads 112 apply a uniform coating of the mixture of epoxy resin and catalyst to the interior wall of the joints of pipe, which tenaciously adheres to the pipe and soon cures to provide a smooth uniform protective coating.

The speed at which the lances are withdrawn from the pipe governs the thickness of the coating applied to the pipe. The speed of travel of the carirage and therefore the lance is selected by adjustment of the handwheel 26 which moves the motor 22 to automatically adjust the effective diameter of the spring-biased, split sheeve pulley 28. This adjustment changes the drive ratio between the pulley 28 and the sheeve 32 to alter the speed of the carriage, although the speed of the motor 22 remains constant, to provide a coating pass or rearward travel of the carriage at a uniform but selected speed.

Once the carriage 18 has been moved forward on the tracks 10 and 12, the three roller sets A, B and C will have been depressed into the pivotally retracted position shown in FIG. 6 by passage of the wedge cam 103 as the carriage traveled forward over the respective sets of rollers. Therefore, the carriage 18 is free to pass successively back over the retracted sets C, B and A of rollers as the lances are withdrawn to coat the pipe. As the carriage 18 passes over each retracted set of rollers, the roller cam 105 engages the cam lever 104 just after the rear end of the wedge cam 103 passes the respective roller 76. The roller 76 and corresponding arms 78 are then raised by engagement of the roller cam 105 with the lever cam 104 until the line of force of the spring 98 passes above the pivot shaft 80. Then the spring 98 forces the roller 76 back against the wedge cam 103. The wedge cam 103 then slowly permits the spring 98 to pivotally raise the interconnected rollers 76 until each of the three rollers of the particular roller set engages the respective lances 62, 64 and 66. As the carriage 18 successively passes each roller set C, B and A as the carriage travels rearwardly, the respective sets of rollers are raised in the same manner to support the lances as they are withdrawn from the joints of pipe.

Thus, it will be evident that an internal coat of coal tar epoxy resin of any desired thickness can be applied by the described machine to pipe having a diameter as small as two inches or as large, for example, as 10 or 12 inches. The uniformity and quality of the protective coat is insured by many control factors. The epoxy resin is continually heated and agitated while in the supply receptacle 176. This insures that the gravity flow of the resin to the positive displacement auger pump 182 will be uniform. The heated, lower viscosity resin can be more efficiently pumped into the three lances and through the very small diameter tubular conduits extending through the respective lances to the respective mixing chambers. The resin is continually heated by the strip heater within each lance to insure a low viscosity as the resin is introduced to the mixing chamber 134. The catalyst is also heated to the same temperature as it passes through the lance to insure that it does not spot cool the resin upon first contact to create a non-homogenous viscosity mixture in the mixing chamber. The heated, low-viscosity resin and catalyst is also much more easily and thoroughly mixed in the mixing chamber 134. The heated, and therefore more fluid mixture easily passes through the funnel member 162 and is more uniformly distributed to the periphery of centrifugal applicator head 112. The resin is then passed through the fine mesh of the screen cylinder 165 and can be spread in a more uniform, thinner coat on the interior surface of the pipe. This not only assures a more uniform coat, but also permits the thickness to be reduced and thereby conserve on coating material.

The proper volume of catalyst is introduced to each of the three mixing chambers 134 on the respective lances by separate positive displacement gear pumps. The catalyst is a very low viscosity fluid and only about one part of catalyst for each 20 parts of resin is required for proper curing. If too little catalyst is supplied, the coat of resin will not uniformly cure which results in a defective coat. If the resin does not harden, the coat is useless and the sticky black resin is extremely difficult to clean from the interior surface of the small diameter pipe so that it can be recoated. Due to the relatively large volume and higher pressures of the resin being pumped, only one pump can be used and still obtain relatively even distribution to the three lances. But due to the low viscosity and small volume of the catalyst being pumped, separate pumps are required for each of the three lances. Otherwise, unequal friction losses alone would result in unequal volume distribution to the three lances if only one catalyst pump were used to supply all three lances. Visual flow meters are also provided to insure that the proper amount of catalyst is being pumped.

The total volume of both resin and catalyst pumped can be adjusted to an optimum by adjustment of the position of the motor 212 by handwheel 219 which automatically varies the effective diameter of the pulley 214 which controls the speed of the several pumps. The size of the sprockets 228 and 232 can be changed to change the ratio of catalyst to resin or to compensate for differences in pumping efficiencies of the gear pumps to the auger pump at different operating r.p.m. However, since the pumps are driven by the same prime mover 212, the same proportionate parts of resin and catalyst will be pumped so long as the pumps are operated at a selected r.p.m.

As previously mentioned, the thickness of the coating is controlled by the selection of a particular uniform speed at which the lances are withdrawn from the joints of pipe. Selection of the speed of the lances is made by adjusting the effective diameter of the pulley 28 by adjustment of the motor 22 as described. For a given diameter pipe, the faster the speed, the thinner the coat; the slower the speed, the thicker the coat. As the diameter of the pipe being coated increases, the travel of the lances must be slowed in order to apply a coating of the same thickness to the greater wall area of the larger pipe. This novel mechanism for controlling the thickness of the coating used in combination with the novel means for supporting the lances within large diameter pipe, results in a highly versatile machine which can readily be used to coat almost any size pipe.

The improved lance described can be readily constructed in a size which can be inserted into a two inch pipe. Yet the lance provides the centrifugal applicator head and mixing chamber at the end of the long lance which is essential for applying coal tar epoxy resins because of the troublesome physical properties of resins previously referred to. The small diameter results from the manner in which the drive shaft passes through the mixing chamber and the manner in which the mixture of resin and catalyst is delivered to the centrifugal applicator. Also, it will be noted that the drive shaft must be of substantial diameter to prevent appreciable twisting due to varying torque loads on the long shaft, primarily caused by flexure of the lance as it is removed from the joint of pipe. If the shaft is subject to excessive twisting, the shaft will alternately wind and unwind like a rubber band so that the r.p.m. of the applicator head will be irregular and result in a coating of irregular thickness.

The sheath-like bearing housing 118 not only provides a minimum diameter bearing for substantially the length of the shaft, but also shields the rotating shaft from the fluid conduits and heating element within the small diameter lance housing, to permit construction of the relatively long, small diameter lance. The novel manner in which the drive shaft 116 and the bearing housing 118 are constructed of joints provides an effective and practical manner in which the shaft can be constructed of great length.

The lances, which are relatively long and limber, are continually supported as they are inserted and withdrawn from the joints of pipe, regardless of the diameter of the pipe being coated. The lances are always supported by the roller 68 and 76 while over the track, and the lances rest directly on the interior surface of small diameter pipe. When inserted in larger diameter pipe, the lances are supported by the novel devices of FIG. 12, which by reason of their novel construction, do not interfere with operation of the support rollers 68 and 76. This prevents excessive flexure of the drive shaft and maintains the centrifugal applicator head properly aligned along the axis of the pipe being coated.

Having thus described a particular embodiment of our invention, it is to be understood that various changes and substitutions can be made therein without departing from the spirit and scope of our invention as defined by the appended claims.

We claim:

1. Apparatus for internally coating small diameter pipe comprising, in combination:
   a track having front and rear ends;
   a carriage traveling on the track;
   reversible drive means for propelling the carriage in either direction over the track;
   at least one elongated lance having a coating applicator head at one end and connected at the other end to the carriage, the lance being disposed parallel to the track and extending toward the front end of the track;
   a plurality of spaced support rollers for supporting the lance, the support rollers being retractable below the track responsive to passage of the carriage over the support rollers toward the front end of the track and being raised by passage of the carriage over the support rollers toward the rear end of the track
   and means carried by said carriage and successively engageable with said retractable support rollers for retracting each of said rollers when said carriage moves toward the front end of the track and for raising said retractable support rollers when said carriage moves toward the rear end of the track;
   whereby the lance may be inserted in a pipe and then withdrawn therefrom to coat the interior wall of the pipe.

2. Apparatus for internally coating small diameter pipe comprising the combination as set out in claim 1 wherein:
   the reversible drive means is further characterized by means for selectively adjusting the speed at which the carriage is propelled over the track in the rearward direction, the selected speed being constant for the duration of the carriage travel
   and the apparatus is further characterized by a plurality of support means connected at spaced points along the lance and insertable into a pipe for supporting the lance along the axis of the pipe,
   whereby the apparatus will be adapted to coat pipe having a diameter appreciably greater than the diameter of the lance.

3. Apparatus for internally coating small diameter pipe comprising the combination as set out in claim 1
   wherein the lance has a mixing chamber for mixing coal tar epoxy resin and catalyst to be applied by the coating application head, and
   further characterized by a positive displacement resin pump mounted on the carriage for pumping coal tar epoxy resin to the mixing chamber;

positive displacement catalyst pump means mounted on the carriage for pumping catalyst to the mixing chamber and a constant speed prime mover mounted on the carriage and coupled to drive both the resin pump and catalyst pump means at a constant predetermined speed ratio whereby the volume and proportionate parts of resin and catalyst delivered to the mixing chamber will be constant.

4. Apparatus for internally coating small diameter pipe comprising, in combination:

a track comprised of a pair of parallel rails having front and rear ends;

a carriage traveling on the track;

reversible drive means for propelling the carriage in either direction over the track;

at least one elongated lance having a coating applicator head at one end and connected at the other end to the carriage, the lance being disposed between and above the rails and extending parallel thereto;

a plurality of support rollers disposed between the rails at spaced intervals for supporting the lance;

a pivoted arm supporting each roller;

spring means for normally biasing the arm into an upwardly extending position for supporting the lance and, upon depression of the arm past a certain point, for biasing the arm into a retracted position to permit passage of the carriage over the respective roller and arm;

cam means on the carriage for depressing each successive roller and respective arm down past the certain point whereby the spring means will retain the arm depressed as the carriage passes forwardly over the respective roller;

and second cam means on the carriage for raising the arm and roller as the carriage passes rearwardly over the respective roller.

5. Apparatus for internally coating small diameter pipe comprising the combination as set out in claim 4 wherein:

the number of lances is three; and the support rollers for the three lances comprise a plurality of spaced sets of three rollers aligned transversely of the track, one roller of each set for supporting each lance, the three rollers of each set being supported by an arm, the arms being connected to a pivotable axle whereby all three rollers of a set will be moved together, and the spring means and cam means and second cam means will actuate all three support rollers of each set simultaneously.

6. Apparatus for internally coating small diameter pipe comprising, in combination:

a track comprised of a pair of parallel rails having front and rear ends;

a carriage traveling on the track;

reversible drive means for propelling the carriage in either direction over the track;

at least one elongated lance having a coating applicator head at one end and connected at the other end to the carriage, the lance being disposed between and above the rails and extending parallel thereto;

a plurality of support rollers disposed between the rails at spaced intervals for supporting the lance;

a pivoted arm supporting each roller;

spring means for normally biasing the arm into an upwardly extending position for supporting the lance and, upon depression of the arm past a certain point, for biasing the arm into a retracted position to permit passage of the carriage over the respective roller and arm;

cam means on the carriage for depressing each successive roller and respective arm down past the certain point whereby the spring means will retain the arm depressed as the carriage passes forwardly over the respective roller;

and second cam means on the carriage for raising the arm and roller as the carriage passes rearwardly over the respective roller;

the lance having an elongated tubular lance housing connected at one end to the carriage;

a mixing chamber connected to the other end of the lance housing;

a flexible drive shaft extending from the carriage means through the lance housing and through the mixing chamber;

a bearing housing around the shaft and within the lance housing for providing continuous bearing support to the shaft for substantially the length of the lance housing;

a prime mover on the carriage for rotating the drive shaft;

a centrifugal applicator head connected to the end of the drive shaft and rotated thereby;

a coating material conduit extending through the lance housing and interconnecting a supply of coating material with the mixing chamber;

a catalyst conduit extending through the lance housing and interconnecting a supply of catalyst and the mixing chamber;

an electrical resistance heater within and extending the length of the lance housing for heating the coating material and catalyst within the respective conduits;

mixing blades within the mixing chamber connected to and rotated by the drive shaft passing therethrough for mixing coating component and a catalyst introduced by the respective conduit means to the mixing chamber, and conduit means communicating between the mixing chamber and the centrifugal applicator head for delivering the mixture of coating component and catalyst from the mixing chamber to the applicator head.

7. Apparatus for internally coating small diameter pipe comprising, in combination:

a track comprised of a pair of parallel rails having front and rear ends;

a carriage traveling on the track;

reversible drive means for propelling the carriage in either direction over the track;

at least one elongated lance having an applicator head at one end and connected at the other end to the carriage, the lance being disposed between and above the rails and extending parallel thereto;

a plurality of support rollers disposed between the rails at spaced intervals for supporting the lance;

a pivoted arm supporting each roller;

spring means for normally biasing the arm into an upwardly extending position for supporting the lance and, upon depression of the arm past a certain point, for biasing the arm into a retracted position to permit passage of the carriage over the respective roller and arm;

cam means on the carriage for depressing each successive roller and respective arm down past the certain point whereby the spring means will retain the arm depressed as the carriage passes forwardly over the respective roller;

and second cam means on the carriage for raising the arm and roller as the carriage passes rearwardly over the respective roller;

the lance having an elongated tubular lance housing connected at one end to the carriage;

a mixing chamber connected to the other end of the lance housing;

a flexible drive shaft extending from the carriage means through the lance housing and through the mixing chamber;

a bearing housing around the shaft and within the lance housing for providing continuous bearing support to the shaft for substantially the length of the lance housing;

a prime mover on the carriage for rotating the drive shaft;

a centrifugal applicator head connected to the end of the drive shaft and rotated thereby;

a coating resin conduit extending through the lance housing and interconnecting a supply of coating material with the mixing chamber;

a catalyst conduit extending through the lance housing and interconnecting a supply of catalyst and the mixing chamber;

an electrical resistance heater within and extending the length of the lance housing for heating the coating material and catalyst within the respective conduits;

mixing blades within the mixing chamber connected to and rotated by the drive shaft passing therethrough for mixing coating component and a catalyst introduced by the respective conduit means to the mixing chamber and the centrifugal applicator head for delivering the mixture of coating component and catalyst from the mixing chamber to the applicator head;

first positive displacement pump means on the carriage for pumping coating material through the coating material conduit to the mixing chamber;

second positive displacement pump means on the carriage for pumping the catalyst through the catalyst conduit to the mixing chamber; and a second prime mover on the carriage connected to drive both the first and second pump means at fixed speed ratios.

8. Apparatus for internally coating small diameter pipe as defined in claim 7 wherein the number of lances is three and the second positive displacement pump means comprises three separate positive displacement pumps, each connected to pump catalyst through the catalyst conduit of one of the lances.

9. An improved lance for applying a coat of coal tar epoxy resin or the like to the interior wall of small diameter pipe as defined in claim 8 wherein the mixing chamber is comprised of a first end wall threaded into the lance housing, a tubular sleeve threaded onto the first end wall and a second end wall threaded into the tubular sleeve, the drive shaft extends through and is journaled in bearings in the first and second end walls, a plurality of exit bores in the second end wall, a funnel sleeve threaded onto the tubular sleeve around the drive shaft, the sleeve having an open end, and the applicator head is comprised of a disc connected to the shaft at a right angle thereto and disposed adjacent the open end of the funnel sleeve and a wire mesh cylindrical screen connected to the disc and disposed around the funnel sleeve.

10. An improved lance for applying a coat of coal tar epoxy resin or the like to the interior wall of small diameter pipe comprising:

a long, small diameter tubular lance housing, means forming a mixing chamber connected to the end of the lance housing and axially aligned therewith, a flexible drive shaft extending through the lance housing and through the mixing chamber, a flexible bearing housing around the drive shaft having an internal diameter closely receiving the drive shaft and extending substantially the length of the lance housing, resin conduit means extending through the housing and connected to the mixing chamber for introducing resin thereto, catalyst conduit means extending through the housing and connected to the mixing chamber for introducing catalyst thereto, an electrical resistance heating element extending the length of the lance housing and in heat exchange relation with both conduit means, and a centrifugal applicator head connected to the end of the flexible drive shaft extending through the mixing chamber for receiving a mixture of resin and catalyst from the mixing chamber and applying the mixture to the interior wall of a pipe.

11. An improved lance for applying a coat of coal tar epoxy resin or the like to the interior wall of small diameter pipe comprising:

a long, small diameter tubular lance housing, means forming a mixing chamber for mixing resin and catalyst and connected to the end of the lance housing, a flexible drive shaft extending through the lance housing and through the mixing chamber, said drive shaft comprising a plurality of joints interconnected by threaded tap and stud couplings having a torque bearing shoulder therebetween, a centrifugal applicator head connected to be driven by the shaft, and a tubular drive shaft bearing housing around the drive shaft and having an internal diameter to closely receive the drive shaft in substantially continuous bearing support for substantially the length of the bearing housing, said bearing housing including a plurality of sections of tubular pipe interconnected by threaded collar couplings.

References Cited by the Examiner
UNITED STATES PATENTS

| Re. 24,601 | 2/59 | Lewis | 117—96 |
| 1,140,430 | 5/15 | Woodward. | |
| 1,913,757 | 6/33 | Hannon | 118—317 X |
| 2,334,294 | 11/43 | Stevens | 25—38 |
| 2,431,658 | 11/47 | Demb et al. | 118—317 |
| 2,551,722 | 5/51 | Bowen | 118—317 |
| 2,554,829 | 5/51 | Jeurling | 229—135 |
| 2,792,807 | 5/57 | Cummings | 118—105 X |
| 2,845,366 | 7/58 | Schroeder | 117—96 X |
| 2,910,042 | 10/59 | Gallmeyer et al. | 118—306 X |
| 2,926,106 | 2/60 | Gauthier | 118—626 X |
| 3,029,027 | 4/62 | Gray | 118—306 X |
| 3,034,729 | 5/62 | Gray et al. | 118—306 X |
| 3,044,441 | 7/62 | Blakeslee et al. | 118—317 |
| 3,048,498 | 8/62 | Juvinall et al. | 118—626 X |

RICHARD D. NEVIUS, *Primary Examiner.*

JOSEPH B. SPENCER, *Examiner.*